(12) United States Patent
Plumley et al.

(10) Patent No.: US 7,975,223 B2
(45) Date of Patent: Jul. 5, 2011

(54) MOVE TRACKING WITH CONFLICT RESOLUTION

(75) Inventors: Margaret Ann Plumley, Bellevue, WA (US); William Bradley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 11/788,970

(22) Filed: Apr. 23, 2007

(65) Prior Publication Data
US 2008/0263442 A1 Oct. 23, 2008

(51) Int. Cl.
G06F 17/00 (2006.01)
(52) U.S. Cl. ....................................... 715/255
(58) Field of Classification Search .................... 715/255
See application file for complete search history.

(56) References Cited

U.S. PATENT DOCUMENTS

| 5,630,080 | A | * | 5/1997 | Malamud et al. ............. 715/769 |
| 5,831,617 | A | | 11/1998 | Bhukhanwala |
| 6,336,217 | B1 | | 1/2002 | D'Anjou et al. |
| 6,891,551 | B2 | * | 5/2005 | Keely et al. ................... 715/762 |
| 6,910,188 | B2 | | 6/2005 | Keohane et al. |
| 6,944,821 | B1 | * | 9/2005 | Bates et al. ................... 715/209 |
| 6,986,105 | B2 | * | 1/2006 | Walker, Jr. .................... 715/222 |
| 2002/0083093 | A1 | | 6/2002 | Goodisman et al. |
| 2003/0005041 | A1 | | 1/2003 | Ullmann et al. |
| 2003/0070143 | A1 | | 4/2003 | Maslov |
| 2004/0001606 | A1 | | 1/2004 | Levy |
| 2004/0205658 | A1 | * | 10/2004 | Posh et al. .................... 715/530 |
| 2005/0102630 | A1 | * | 5/2005 | Chen et al. .................... 715/770 |
| 2005/0120103 | A1 | | 6/2005 | Godin |
| 2005/0138540 | A1 | | 6/2005 | Baltus et al. |
| 2006/0184867 | A1 | | 8/2006 | Shpigel |

FOREIGN PATENT DOCUMENTS
WO WO 2005/052789 A2 6/2005

OTHER PUBLICATIONS

Bellini, et al., "Cooperative Visual Manipulation of Music Notation", copyright 2002 ACM, ACM Transactions on Computer-Human Interaction, vol. 9, No. 3, Sep. 2002, p. 194-237.*
Dewan, et al., "Controlling Access in Multiuser Interfaces" copyright 1998 ACM, ACM Transactions on Computer-Human Interaction, vol. 5, No. 1, Mar. 1998, p. 34-62.*
Xiaomin Wu, "Visualization of Version Control Information," University of Victoria, 2003, pp. 1-116, http://www.hwswworld.com/downloads/9_28_05_e/XiaominWu_thesis.pdf.
Bendix et al., "VTML for fine-grained change tracking in editing structured documents," Lecture Notes in Computer Science, Date Unknown, Publication date: 1999; ISBN:3-540-66484-X pp. 1-19, htip://www.cs.unibo.it/~fabio/bio/papers/1999/SCM99/SCM9.pdf.

* cited by examiner

*Primary Examiner* — Amelia Rutledge
(74) *Attorney, Agent, or Firm* — Merchant & Gould

(57) ABSTRACT

Move tracking with conflict resolution is provided. When a tracked move of text or other objects from one location in a document to a second location in the document is performed, data representing a pre-move state of the text or objects and data representing a post-move state of the text or objects are stored for subsequent comparison. If the text/object move is subsequently rejected, a comparison is made between the post-move state and the pre-move state to determine if changes have been made to the text or objects after the move to the second location. If changes have been made, a conflict resolution dialog is automatically launched and displays a graphical representation of the two versions of the moved text or objects. The user may then select one of the two versions for replacement back to the first document location to complete the move rejection.

20 Claims, 4 Drawing Sheets

MOVE TRACKING WITH CONFLICT RESOLUTION

BACKGROUND

Some software applications, for example, some word processing applications, allow users to track changes made to text or objects in an electronic document so that edited content may be readily distinguished from non-edited content. For example, if a word or sentence is added to existing text, the added content may be underlined or otherwise distinguished to show where and what new content has been added. Deleted content may be shown as lined-through or may be shown in a "balloon" user interface component displayed off to one side of the document. According to prior track changes systems, moved text or objects are typically indicated as being deleted from a starting location and as being inserted in an ending location. Such systems can cause confusion to a reviewing user because it may not be readily apparent that the text or object was simply moved to a new location, and such information may be relevant to the reviewing user. In addition, according to prior systems, track changes highlighting notations shown in moved text prior to the move are not shown in the text after the text is moved to the new location. Moreover, if the editing user decides to reject the move, the user may have no way of readily determining the nature of edits made to the text at the starting (pre-move) location, if any, as compared to edits made to the text at the ending (post-move) location, if any, so that the user may decide which of the two text versions to keep at the starting location after rejection of the text move.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing move tracking with conflict resolution. When a tracked move of text or other objects from one location in a document to a second location in the document is performed, data representing a pre-move state of the text or objects and data representing a post-move state of the text or objects are stored for subsequent comparison. If the text/object move is subsequently rejected, a comparison is made between the post-move state and the pre-move state to determine if changes have been made to the text or objects after the move to the second location. If changes have been made, a conflict resolution dialog is automatically launched and displays a graphical representation of the two versions of the moved text or objects. The user may then select one of the two versions for replacement back to the first document location to complete the move rejection.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
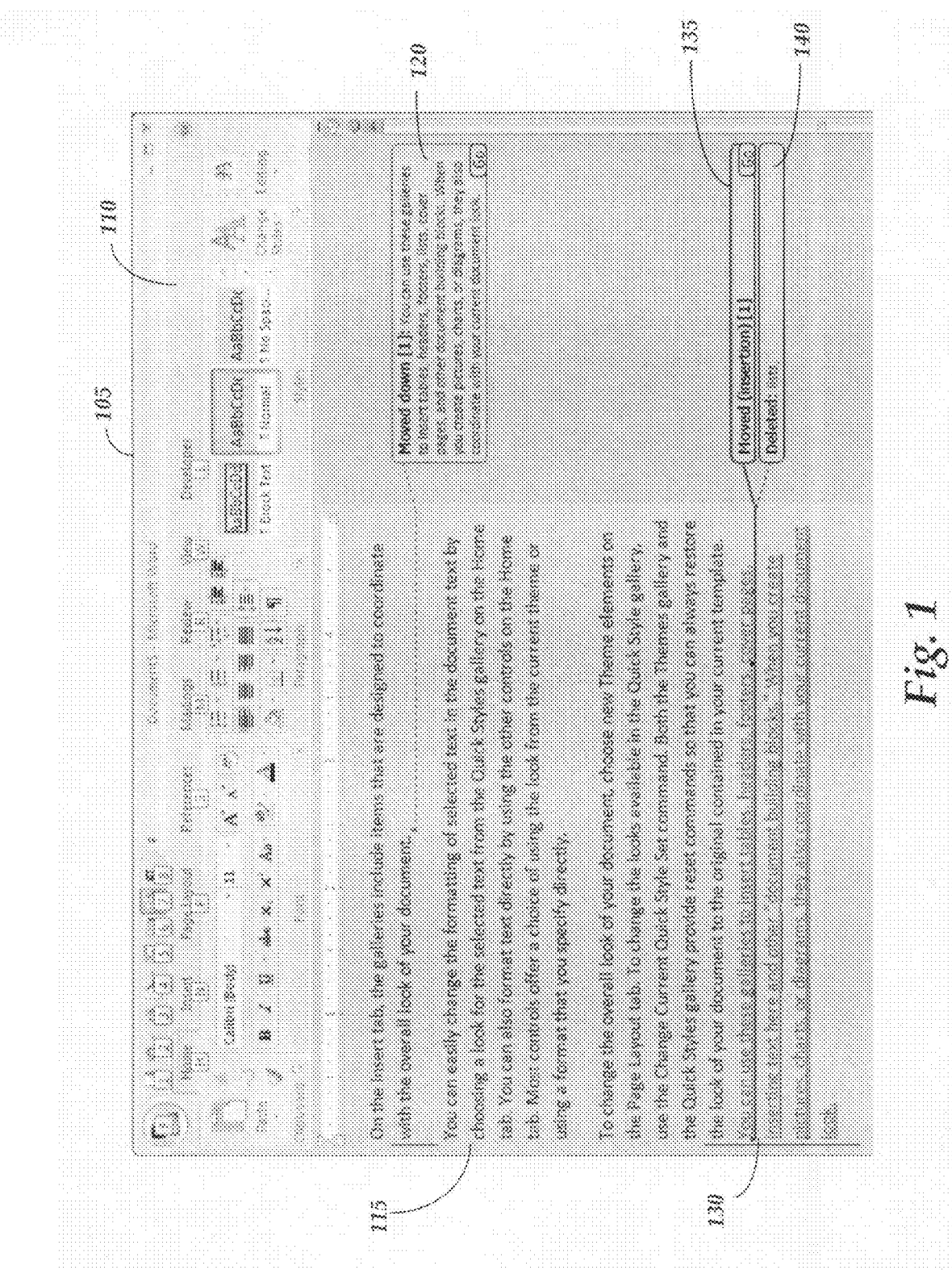
FIG. 1 is an example computer screen display of a graphical user interface showing a displayed document with tracked changes associated with a moved text selection.

As briefly described above, embodiments of the present invention are directed to text/object move tracking with conflict resolution for rejected text/object moves. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

According to embodiments of the invention, text and/or objects (hereafter "content") contained in a document along with any current tracked edits are stored in memory. If a tracked move is performed, a selected portion of document content is moved from a first, original, starting or "moved from" location in the document to a second, ending or "moved to" location in the document. In order to move the selected content portion, the data stored in memory in the range associated with the selected content portion along with any tracked edits is copied to the "moved to" location. Data representing the document in the pre-move state, as well as, data representing the document in the post-move state are stored to memory.

If a rejection of the content move is subsequently received, for example, via a "reject move" command, a comparison of the pre-move content state is made against the corresponding post-move content state to determine whether the text/objects comprising the moved content have been changed since the move operation. If changes have been made to the moved text/objects, a conflict resolution dialog is displayed to notify the user that the content in the "moved to" location may be different from the content in the "moved from" location. According to one embodiment, a graphical representation of the content at the original location is shown adjacent to a graphical representation of the content at the new location. The user may then select which version of the content the user desires to be moved back to (that is, kept at) the original or starting location. In either case, any tracked changes showing in the chosen version will follow the content to the original location and will be displayed after the move rejection operation is complete.

FIG. 1 is an example computer screen display of a graphical user interface showing a displayed document with tracked changes associated with a moved text selection. The user interface 105 shown in FIG. 1 is illustrative of any of a number of software application user interfaces in which a document 115 may be displayed and edited. According to embodiments, the user interface 105 is provided by a software application 100 with which text/objects are entered and edited as described herein and with which move tracking with conflict resolution may be performed. For example, the user interface 105 may be a graphical user interface associated with a word processing application, for example, MICROSOFT OFFICE WORD™ manufactured by MICROSOFT CORPORATION of Redmond, Wash. A functionality section 110 is illustrated at the top of the user interface 105 for providing one or more functionality buttons and controls for applying functionalities of the associated software application.

According to embodiments, when a track changes function of the software application 100 is enabled, changes made to text or objects in the document 115 are highlighted in some manner to distinguish the edited content from non-edited content. For example, according to one track changes system, inserted words or sentences are underlined to distinguish them from existing words or sentences. Similarly, inserted words or sentences may be color-coded to further distinguish them for existing content. Deleted words or sentences may be shown as "lined-through," and text moved from one location to a second location may be underlined with a double underlining 130 to distinguish text moved from a first location to a second location from text inserted into a given location.

For another track changes example, as illustrated in FIG. 1, a "balloon" 120 may be displayed off to one side of the document 115 and may be used for displaying editing information associated with a given document 115. As illustrated in FIG. 1, a portion of text has been moved from a first location in the document 115 to a second location in the document 115. The balloon 120 is utilized for displaying the text moved from the first or "moved from" location to the second location, and a corresponding balloon 135 is used for identifying the insertion point at which the moved text is placed. An additional balloon 140 is illustrated showing that a word "lists" has been deleted from the text selection after it was moved to the second or "moved-to" location. Other methods for showing track changes information may include displaying such information in a review pane located adjacent to a displayed document 115. As should be appreciated, these described methods for distinguishing edited content from non-edited content in a track changes system are for purposes for example only and are not exhaustive of the numerous ways in which edited content may be highlighted in a document for distinguishing the edited content from non-edited content.

According to embodiments, when a selected content portion is moved from an original, starting or "moved from" location to a new, ending or "moved to" location, the selected content along with any presently displayed track changes notations is moved from the starting location to the new location. As the document 115 is entered and edited, the software application 100, for example, a word processing application, responsible for receiving the entry and edit of the document 115 stores data representing the content and any changes made to the content along with any track changes notations, for example, underlining, line-throughs, double underlining, color-coding, and the like.

If a portion of such a document is moved from a first location to a second location, the software application 100 will retrieve data representing the text portion to be moved along with any track changes notations presently applied to the selected text portion. The selected content portion will then be displayed at the second location in response to a move operation, cut and paste operation, drag and drop operation, or any suitable operation for moving text from one location to another location. At the second location, the selected content portion will be displayed, and any track changes notations applicable to the moved content likewise will be displayed at the new document location. According to embodiments, once the selected content portion is successfully moved to the new location, the software application 100 then will store data representing the document 115 in its present state, including the positioning of the selected content portion in the new location in response to the move operation. In addition, data representing any track changes notations applied to the moved content will be stored as well.

If an editing user makes additional changes to the document 115, data representing the document 115 as modified similarly will be stored. In particular, if changes are subsequently made to the content that was moved from a first location to a second location in the document 115, data representing the changes made to the moved content along with any track changes notations applied to the moved content will be stored. Thus, as will be described below, if it is subsequently decided that the content move should be rejected so that the moved content is moved back to the original or starting location, the software application 100 may compare data representing post-move state of the moved content with the pre-move state of the moved content for providing conflict resolution, as described below.

Figure 2:
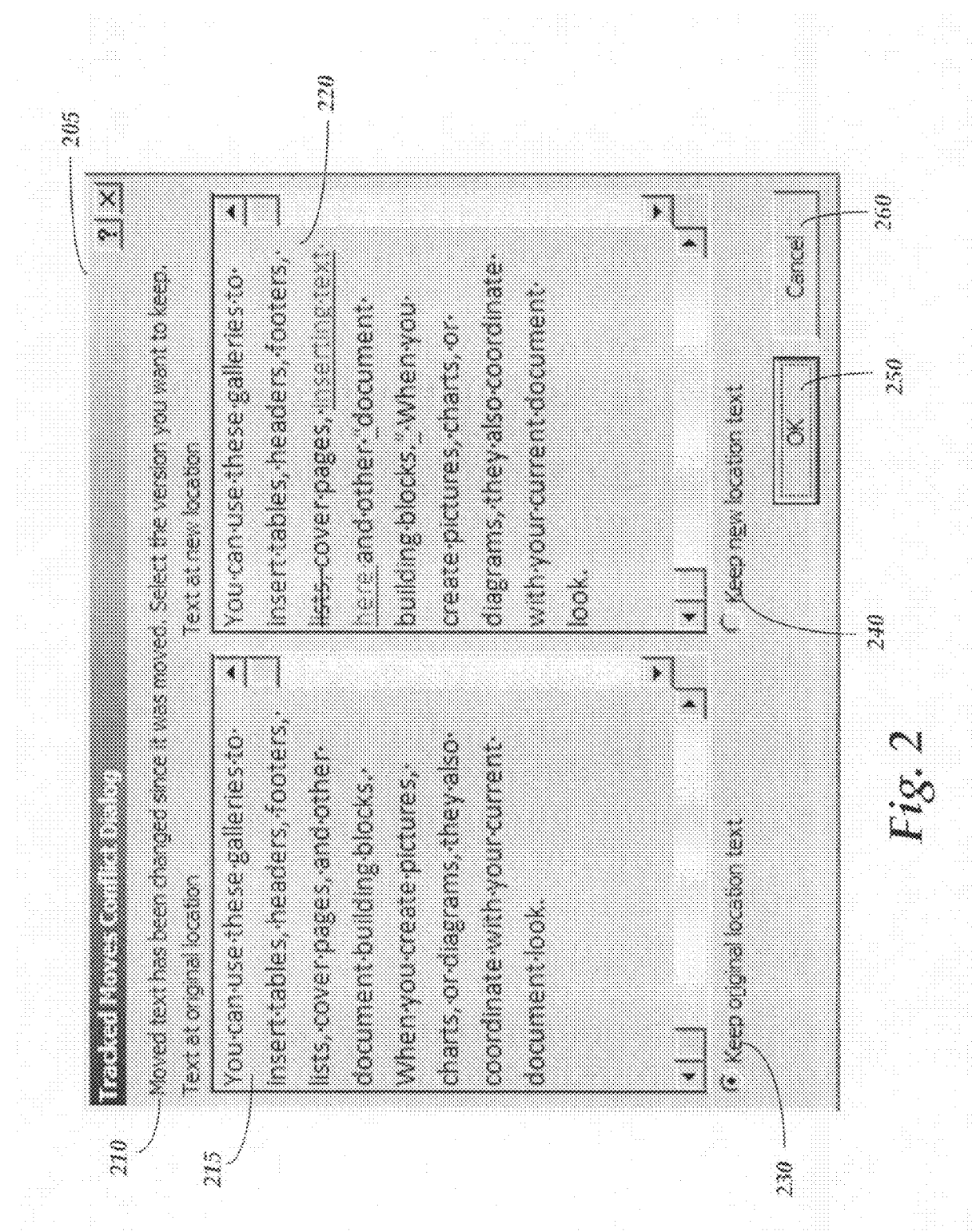
FIG. 2 is an example computer screen display of a conflict resolution dialog showing a comparison of two text selections.

FIG. 2 is an example computer screen display of a conflict resolution dialog showing a comparison of two text (document content) selections. According to embodiments, a conflict resolution dialog 205 is provided for allowing a user to select a "moved from" version or a "moved to" version of a given document content portion for keeping at an original document location if a tracked content move is subsequently rejected. For example, after completion of a text editing session, the track changes function may be utilized for browsing through changes made to the document 115 and for selectively accepting or rejecting individual or all changes. If the track changes function reaches a position in the document 115 containing a tracked content move, the user will be allowed to accept or reject the content move. If the content in the "moved to" location has been changed after the content move, the dialog 205 will allow resolution of a conflict between the "moved to" version of the content and the "moved from" version, as described below.

According to embodiments, if the user decides to reject a content move, the software application 100 retrieves data representing the present state of the moved content, including data representing any track changes notations applied to the moved content and generates a "moved to" document 220 containing the moved content. Likewise, the software application 100 retrieves data representing the pre-move state of the moved content including any track changes notations applied to the pre-move content, and the software application 100 generates a "moved from" document 215 containing the pre-move content.

The conflict resolution dialog 205 is then displayed to the user, and a notification text string 210 may be presented for notifying the user that the moved content has changed since it was moved and that the user should select either the changed version of the moved content or the original version of the moved content for replacing back to the original content location when the move is rejected. The document 215, graphically representing the pre-move content state, is displayed along the left side of the dialog 205, and the document 220, graphically representing the post-move content state is displayed along the right side of the dialog 205. A radio button 230 is provided beneath the document 215 for selectively keeping the original pre-move content, and a radio button 240 is illustrated beneath the document 220 for selectively keeping the post-move content. As should be appreciated, the layout of the dialog 205, illustrated in FIG. 2, is for purposes of example only and is not limiting of the variety of different layouts that may be used in accordance with embodiments of the present invention for graphically representing the pre-move content and the post-move content for allowing selection of one of the two versions for keeping at a starting content location in response to a move rejection.

As illustrated in FIG. 2, the documents 215, 220 show track changes notations, if any, applied to the respective content items. If the user selects one of the two documents 215, 220, the text or other objects contained in the selected documents 215, 220 along with any track changes notations will be replaced to the original content location prior to the content move operation. According to one embodiment, if the user selects the original location content (document 215), the software application 100 need only populate the appropriate text range with the content originally located at the starting or original text location. On the other hand, if the user selects the post-move content (document 220), then the software application 100 may copy the content portion 220 along with any track changes notations and other changes made after the content move operation back to the original content location from which the original content move was initiated. Once the user selects one of the radio buttons 230, 240, the user may select the "OK" button 250 for completing the rejection of the content move and for replacing the selected content portion back to the original text location.

Figure 3:
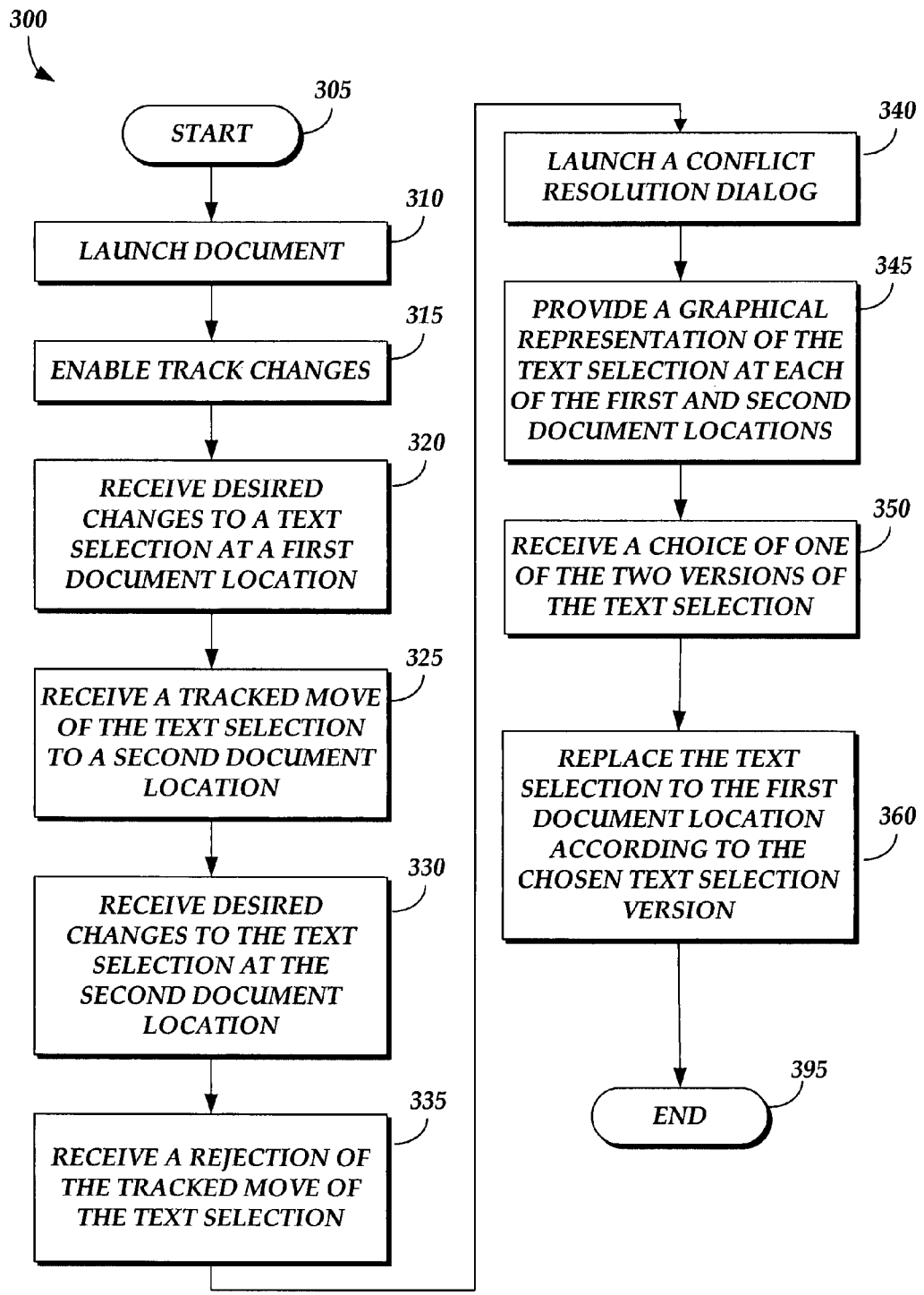
FIG. 3 is a logical flow diagram illustrating a method for move tracking with conflict resolution.

Having described embodiments of the present invention above with respect to FIGS. 1 and 2, it is advantageous to further describe the invention with respect to an example operation of embodiments of the invention. FIG. 3 is a logical flow diagram illustrating a method for move tracking with conflict resolution. For purposes of discussion, consider that an example word processing application 100 is utilized to open and edit an example document, for example, a letter, a memorandum, a report, or the like.

The method 300 begins at start operation 305 and proceeds to operation 310 where an example document 115, for example, a report, is launched for editing as illustrated above in FIG. 2. At operation 315, the user of the document 115 enables a track changes function of the software application 100 for highlighting or "tracking" changes made to the document 115 for distinguishing edited content from non-edited content.

At operation 320, desired changes, if any, are made to a selected portion of text contained in the document 115. For example, an editing user may desire to add a new sentence to a given paragraph of text. Likewise, the user may desire to delete one or more words or sentences from the example paragraph, or the user may apply formatting changes to part or all of a selected portion of text. As described above, if changes are made to the selected portion of text, track changes notations may be applied to the text to distinguish edited content from non-edited content. After completion of operation 320, the software application 100 stores data representing the current state of the document 115, including any changes made to the selected portion of text and any track changes notations applied to the selected portion of text.

At operation 325, a tracked move of the selected portion of text, for example, a paragraph, is received by the software application 100 for moving the selected portion of text from an original, starting or "moved from" location to a new, ending or "moved to" location. In response to the received tracked move, the selected portion of text is moved to the new location. After the selected portion of text is moved to the new location, the software application 100 stores data representing the current state of the document 115, including the new position of the moved selected portion of text and any track changes notations applied to the selected portion of text before it was moved to the new location.

At operation 330, the software application 100 receives desired changes, if any, to the selected portion of text at the new document location. For example, the editing user may desire to add or delete words or sentences to/from the selected portion of text at the new location, or the editing user may desire to make formatting changes to the selected portion of text based at its new location in the document. If any changes are made to the selected portion of text at the new document location, track changes notations are applied to the selected portion of text to distinguish the newly changed or edited content from non-edited content. In addition, the software application 100 stores data representing the document in its current state including data representing any additional changes made to the selected portion of text at the new document location.

At operation 335, the software application 100 receives a rejection of the tracked move of the text selection. For example, the editing user may have decided that the selected portion of text was more suitable at the original document location. When the editing user initiates a command to reject the tracked move, for example, a "reject move" command, the software application 100 retrieves stored data representing the state of the document 115 before the move of the selected portion of text and data representing the current state of the document 115 at the time of receipt of the command to reject the tracked move. The software application 100 compares pre-move data representing the selected portion of text with post-move data representing the selected portion of text to determine whether changes were made to the selected portion of text after it was moved to the new document location.

If the selected portion of text has been changed after it was moved to the new location, the method proceeds to operation 340, and the software application 100 launches a conflict resolution dialog 205, as illustrated in FIG. 2. At operation 345, the software application 100 creates a first document 215 as a representation of the pre-move content, and the software application 100 creates a second document 220 as a representation of the post-move content along with any track changes notations applied to the content for changes made to the content after it was moved to the new location. As illustrated in FIG. 2, the first and second documents 215, 220 are displayed in the conflict resolution dialog 205 for review by the editing user. At operation 350, the editing user chooses one of the two content versions (pre-move versus post-move) for keeping at the original document location of the moved content.

At operation 360, the software application 100 places the chosen version of the moved text portion at the original location of the moved text portion, as described above with reference to FIG. 2. After the chosen text version has been replaced to the original moved content location, as described herein, the method ends at operation 395.

Operating Environment

Figure 4:
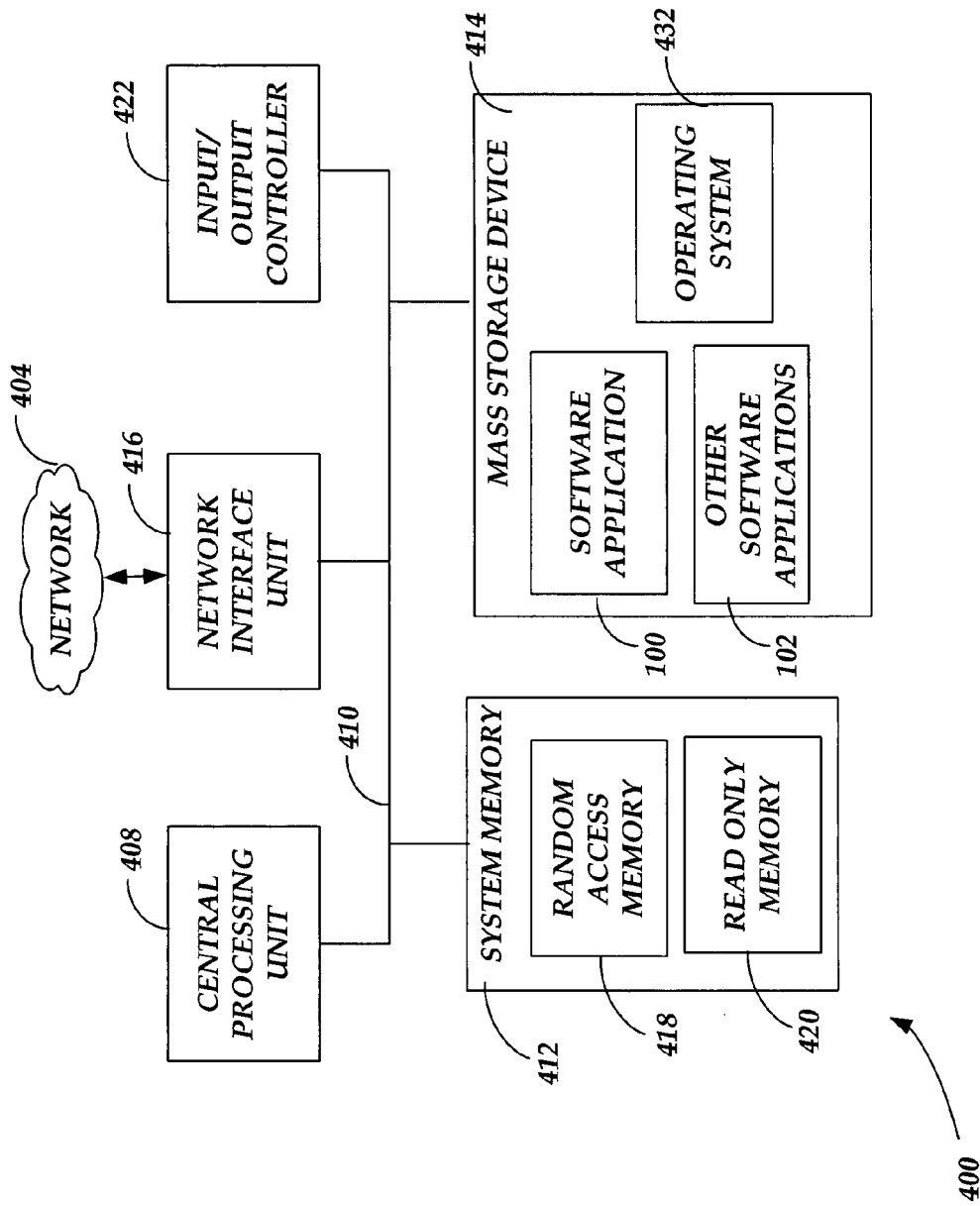
FIG. 4 is a simplified block diagram illustrating an example computing operating environment in which embodiments of the invention may be practiced.

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 400 comprises a general purpose desktop, laptop, handheld, mobile or other type of computer (computing device) capable of executing one or more application programs. The computer 400 includes at least one central processing unit 408 ("CPU"), a system memory 412, including a random access memory 418 ("RAM") and a read-only memory ("ROM") 420, and a system bus 410 that couples the memory to the CPU 408. A basic input/output system containing the basic routines that help to transfer information between elements within the computer, such as during startup, is stored in the ROM 420. The computer 402 further includes a mass storage device 414 for storing an operating system 432, application programs, and other program modules.

The mass storage device 414 is connected to the CPU 408 through a mass storage controller (not shown) connected to the bus 410. The mass storage device 414 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed or utilized by the computer 400.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 400.

According to various embodiments of the invention, the computer 400 may operate in a networked environment using logical connections to remote computers through a network 404, such as a local network, the Internet, etc. for example. The computer 402 may connect to the network 404 through a network interface unit 416 connected to the bus 410. It should be appreciated that the network interface unit 416 may also be utilized to connect to other types of networks and remote computing systems. The computer 400 may also include an input/output controller 422 for receiving and processing input from a number of other devices, including a keyboard, mouse, etc. (not shown). Similarly, an input/output controller 422 may provide output to a display screen, a printer, or other type of output device.

As mentioned briefly above, a number of program modules and data files may be stored in the mass storage device 414 and RAM 418 of the computer 400, including an operating system 432 suitable for controlling the operation of a networked personal computer, such as the WINDOWS® operating systems from MICROSOFT CORPORATION of Redmond, Wash. The mass storage device 414 and RAM 418 may also store one or more program modules. In particular, the mass storage device 414 and the RAM 418 may store application programs, such as a software application 424, for example, a word processing application, a spreadsheet application, a slide presentation application, a database application, etc.

According to embodiments of the present invention, a software application 100 is illustrated with which a document may be created and edited as described herein, and with which the move tracking with conflict resolution embodiments described herein may be practiced. According to an embodiment, the move tracking and conflict resolution functionality may be incorporated into a software application 100, such as a word processing application, or the move tracking and conflict resolution functionality may be in the form of a free standing software module that is called on by the software application 100. Other software applications 102 are illustrative of additional software applications with which the move tracking and conflict resolution functionality of the present invention may operate, such as slide presentation applications, spreadsheet applications, desktop publishing applications, and the like. The move tracking and conflict resolution functionality of the present invention may be equally applicable to any application that provides for movement of content from one location to another location in a document and that provides for tracking changes, including content movement, in a document.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A method of resolving a rejected content move in a document, comprising:
   causing a tracked movement of a portion of content of the document from a first location in the document to a second location in the document;
   receiving an indication of a rejection of the tracked movement of the portion of content from the first location in the document to the second location in the document;

comparing a data representing a pre-move version of the portion of content with a data representing a post-move version of the portion of content to determine if the portion of content has been changed after it was moved to the second location in the document;

providing a graphical representation of the pre-move version of the portion of content and a graphical representation the post-move version of the portion of content in a conflict resolution dialog that is displayed upon a determination that the post-move version of the portion of content is different than the pre-move version of the portion of content, wherein providing a graphical representation of the pre-move version of the portion of content and a graphical representation the post-move version of the portion of content in a conflict resolution dialog includes:

preparing a first document for the pre-move version of the portion of content and preparing a second document for the post-move version of the portion of content and displaying the first and second documents in the conflict resolution dialog to allow a visual comparison of the pre-move version of the portion of content with the post-move version of the portion of content;

receiving an indication, in the conflict resolution dialog, of a selection of one of the pre-move version of the portion of content or the post-move version of the portion of content simultaneously displayed in the conflict resolution dialog for moving the selected version back to the first location in the document; and moving the selected one of the pre-move version of the portion of content or the post-move version of the portion of content to the first location in the document.

2. The method of claim 1, prior to causing a tracked movement of a portion of content of the document from a first location in the document to a second location in the document, further comprising:

receiving a document having one or more text items;
tracking edits to any of the one or more text items; and
displaying one or more graphical notations in the document to distinguish edited document content from non-edited document content.

3. The method of claim 1, prior to moving the selected one of the pre-move version of the portion of content or the post-move version of the portion of content to the first location in the document, further comprising receiving an indication of a tracked move of the portion of content from the first location in the document to the second location in the document.

4. The method of claim 3, further comprising moving the portion of content to the second location in the document along with any graphical notations for distinguishing edited document content from non-edited document content.

5. The method of claim 4, further comprising displaying the portion of content along with any graphical notations for distinguishing edited document content from non-edited document content at the second location in the document.

6. The method of claim 1, after moving the portion of content to the second location in the document, further comprising receiving one or more edits to the portion of content after the portion of content has been moved to the second location in the document.

7. The method of claim 6, prior to causing a tracked movement of a portion of content of the document from a first location in the document to a second location in the document, storing data representing a state of the document before a portion of content is moved from a first location in the document to a second location in the document and storing data representing any tracked changes made to the portion of content after the portion of content is moved from a first location in the document to a second location in the document.

8. The method of claim 7, after moving the portion of content to the second location in the document, storing data representing a state of the document after the portion of content has been moved from the first location in the document to the second location in the document.

9. The method of claim 8, wherein storing data representing a state of the document after the portion of content has been moved from the first location in the document to the second location in the document further comprises storing data representing any tracked changes made to the portion of content after the portion of content has been moved from the first location in the document to the second location in the document.

10. The method of claim 1, wherein providing a graphical representation of the pre-move version of the portion of content and a graphical representation the post-move version of the portion of content includes providing a graphical representation of any tracked changes notations applicable to any changes made in either of the pre-move version of the portion of content or the post-move version of the portion of content.

11. The method of claim 1, wherein receiving an indication, in the conflict resolution dialog, of a selection of one of the pre-move version of the portion of content or the post-move version of the portion of content simultaneously displayed in the conflict resolution dialog for moving the selected version back to the first location in the document includes receiving an indication of a selection of one of the first or second documents displayed in the conflict resolution dialog for moving content associated with the selected first or second document to the first location in the document.

12. One or more computer readable media, wherein the one or more computer readable media do not consist of a propagated data signal, the one or more computer readable media having stored thereon computer executable instructions which when executed by a computer perform a method of resolving a rejected content move in a document, the method comprising:

causing a tracked movement of a portion of content of the document from a first location in the document to a second location in the document;

storing data representing a state of the document before a portion of content is moved from a first location in the document to a second location in the document and storing data representing any tracked changes made to the portion of content before the portion of content is moved from a first location in the document to a second location in the document and storing data representing any tracked changes made to the portion of content after the portion of content has been moved from the first location in the document to the second location in the document;

receiving an indication of a rejection of the tracked movement of the portion of content from the first location in the document to the second location in the document;

comparing data stored for the document before the portion of content is moved to the second location in the document with data stored for the document after the portion of content has been moved to the second location in the document to determine if the portion of content has been changed after it was moved to the second location in the document;

if the portion of content has been changed after it was moved to the second location in the document, launching a conflict resolution dialog for simultaneously displaying, in the conflict resolution dialog, a graphical representation of the pre-move version of the portion of content and a graphical representation the post-move version of the portion of content to allow a visual comparison of the pre-move version of the portion of content with the post-move version of the portion of content;

receiving an indication, in the conflict resolution dialog, of a selection of one of the pre-move version of the portion of content or the post-move version of the portion of content simultaneously displayed in the conflict resolution dialog for moving the selected version back to the first location in the document; and moving the selected one of the pre-move version of the portion of content or the post-move version of the portion of content to the first location in the document.

13. The one or more computer readable media of claim 12, wherein providing a graphical representation of the pre-move version of the portion of content and a graphical representation the post-move version of the portion of content includes providing a graphical representation of any tracked changes notations applicable to any changes made in either of the pre-move version of the portion of content or the post-move version of the portion of content.

14. The one or more computer readable media of claim 12, further comprising preparing a first document for the pre-move version of the portion of content and preparing a second document for the post-move version of the portion of content; and displaying the first and second documents in a conflict resolution dialog to allow a visual comparison of the pre-move version of the portion of content with the post-move version of the portion of content.

15. A system for resolving a rejected content move in a document, comprising:
 a memory for storing executable program code; and
 a processor, wherein the processor is functionally coupled to the memory and responsive to computer-executable instructions contained in the program code and wherein the processor is further operative:
  to cause a tracked movement of a portion of content of the document from a first location in the document to a second location in the document;
  to receive an indication of a rejection of the tracked movement of the portion of content from the first location in the document to the second location in the document;
  to compare a data representing a pre-move version of the portion of content with a data representing a post-move version of the portion of content to determine if the portion of content has been changed after it was moved to the second location in the document;
  to launch a conflict resolution dialog for simultaneously displaying, in the conflict resolution dialog, a graphical representation of the pre-move version of the portion of content and a graphical representation the post-move version of the portion of content to allow a visual comparison of the pre-move version of the portion of content with the post-move version of the portion of content; and
  to receive an indication, in the conflict resolution dialog, of a selection of one of the pre-move version of the portion of content or the post-move version of the portion of content simultaneously displayed in the conflict resolution dialog for moving the selected version back to the first location in the document.

16. The system of claim 15, wherein the processor is further operative to store data representing a first state of the document before a portion of content is moved from a first location in the document to a second location in the document and to store data representing any tracked changes made to the portion of content before the portion of content is moved from a first location in the document to a second location in the document.

17. The system of claim 16, wherein the processor is further operative
 to store data representing a second state of the document after the portion of content has been moved from the first location in the document to the second location in the document, including data representing any tracked changes made to the portion of content after the portion of content has been moved from the first location in the document to the second location in the document; and
 to compare data representing the first state of the document before a portion of content is moved from a first location in the document to a second location in the document with data representing the second state of the document after the portion of content has been moved from the first location in the document to the second location in the document to determine whether conflict resolution between the first and second states is required in response to a command to reject the tracked movement of the portion of content from the first location in the document to the second location in the document.

18. The one or more computer readable media of claim 12, wherein prior to causing a tracked movement of a portion of content of the document from a first location in the document to a second location in the document, further comprising;
 receiving a document having one or more text items;
 tracking edits to any of the one or more text items; and
 displaying one or more graphical notations in the document to distinguish edited document content from non-edited document content.

19. The system of claim 15, wherein the processor is further operative to, prior to causing a tracked movement of a portion of content of the document from a first location in the document to a second location in the document:
 to receive a document having one or more text items;
 to track edits to any of the one or more text items; and
 to display one or more graphical notations in the document to distinguish edited document content from non-edited document content.

20. The system of claim 15, wherein the processor is further operative to move the selected one of the pre-move version of the portion of content or the post-move version of the portion of content to the first location in the document.

* * * * *

UNITED STATES PATENT AND TRADEMARK OFFICE
CERTIFICATE OF CORRECTION

PATENT NO. : 7,975,223 B2  
APPLICATION NO. : 11/788970  
DATED : July 5, 2011  
INVENTOR(S) : Margaret Ann Plumley et al.

Page 1 of 1

It is certified that error appears in the above-identified patent and that said Letters Patent is hereby corrected as shown below:

IN THE CLAIMS:

In column 9, lines 19-20, in Claim 1, delete "content" and insert -- content; --, therefor.

Signed and Sealed this
Twenty-third Day of August, 2011

David J. Kappos
*Director of the United States Patent and Trademark Office*